United States Patent
Yu et al.

(10) Patent No.: US 11,627,088 B2
(45) Date of Patent: Apr. 11, 2023

(54) METHOD FOR PRIORITIZING DATA PACKETS BASED ON APPLICATION SCENARIO, USER STATE AND USER ROLE

(71) Applicant: Agora Lab, Inc., Santa Clara, CA (US)

(72) Inventors: Guang Yu, Shanghai (CN); Yue Cao, Shanghai (CN); Zhaoxu Wang, Shanghai (CN); Liang Si, Shanghai (CN)

(73) Assignee: Agora Lab, Inc., Santa Clara, CA (US)

( * ) Notice: Subject to any disclaimer, the term of this patent is extended or adjusted under 35 U.S.C. 154(b) by 19 days.

(21) Appl. No.: 17/334,911

(22) Filed: May 31, 2021

(65) Prior Publication Data

US 2022/0385584 A1    Dec. 1, 2022

(51) Int. Cl.
*H04L 47/24* (2022.01)
*H04W 28/02* (2009.01)

(52) U.S. Cl.
CPC .......... *H04L 47/24* (2013.01); *H04L 47/2458* (2013.01); *H04W 28/0215* (2013.01)

(58) Field of Classification Search
None
See application file for complete search history.

(56) References Cited

U.S. PATENT DOCUMENTS

| | | | |
|---|---|---|---|
| 8,428,555 B2 | 4/2013 | Kim et al. | |
| 8,917,625 B2 | 12/2014 | Li et al. | |
| 9,386,154 B2 | 7/2016 | Assem et al. | |
| 10,219,202 B1* | 2/2019 | Malasani | H04W 4/30 |
| 10,574,978 B1 | 2/2020 | He | |
| 2008/0112567 A1* | 5/2008 | Siegel | H04R 1/10 |
| | | | 381/74 |
| 2008/0153538 A1* | 6/2008 | O'Shaughnessy | H04M 3/42374 |
| | | | 455/550.1 |
| 2015/0067377 A1* | 3/2015 | Park | G06F 1/3234 |
| | | | 713/340 |
| 2017/0019469 A1* | 1/2017 | Sunay | H04L 67/1053 |

* cited by examiner

*Primary Examiner* — Andre Tacdiran
(74) *Attorney, Agent, or Firm* — The Law Offices of Konrad Sherinian, LLC; Depeng Bi (57) ABSTRACT

A computer software application running on a wireless communication device determines whether an application scenario is urgent or nonurgent, and determines whether the user state is interest, uninterested or absent. The application sends the application scenario and the user state to a wireless networking device. The wireless networking device determines the user roles of different wireless communication devices. It further adjusts priorities of data packets destined to the wireless communication device based on the application scenario, the user state and the user role when downlink to the wireless communication device is congested. The priority is decreased when the application scenario is unurgent, the user role is a listener, and the user state is uninterested or absent.

5 Claims, 10 Drawing Sheets

Prior art

| 801.1p Type of Service (ToS) | 802.11 User Precedence (UP) | Access Category (AC) |
|---|---|---|
| 7 | 7 | AC_VO (Voice) |
| 6 | 6 | |
| 5 | 5 | AC_VI (Video) |
| 4 | 4 | |
| 3 | 3 | AC_VBE (Best effort) |
| 2 | 2 | |
| 1 | 1 | AC_VBK (Background) |
| 0 | 0 | |

METHOD FOR PRIORITIZING DATA PACKETS BASED ON APPLICATION SCENARIO, USER STATE AND USER ROLE

CROSS REFERENCE TO RELATED APPLICATIONS

None.

FIELD OF THE DISCLOSURE

The present invention generally relates to wireless communications, and more particularly relates to a system and method for prioritizing data packets over congested wireless links. More particularly still, the present disclosure relates to a system and method for prioritizing data packets over congested wireless networks based on application scenarios, user states and user roles.

DESCRIPTION OF BACKGROUND

IEEE 802.11e (also referred as IEEE 802.11e-2005) is an amendment to the IEEE 802.11 communication standard. It defines a set of quality of service (QoS) enhancements for wireless local area network (LAN) computer software applications through modifications to the media access control (MAC) layer. The IEEE 802.11e standard is very important for delay-sensitive applications, such as voice over Wireless LAN (WLAN) and streaming multimedia applications. The Wi-Fi Multimedia (WMM) standard is a subset of the IEEE 802.11e wireless LAN specification that enhances QoS on a Wi-Fi wireless network by prioritizing data packets according to four categories. Network administrators can change priority levels as they see fit.

The four categories of data packets, ranged from the highest priority to the lowest priority, include voice, video, best effort and background. Voice data packets are assigned with the highest priority to enable concurrent Voice over IP (VoIP) calls with minimal latency and the highest quality possible. Video data packets are assigned with the second highest priority to support for high quality video streams, such as standard definition TV (SDTV) streams or high definition TV (HDTV) streams over a WLAN. Best effort data packets are packets from legacy devices or from applications or devices that lack QoS standards. Background data packets are those of file downloads, print jobs and other traffic that does not suffer from increased latency.

Figure 1:
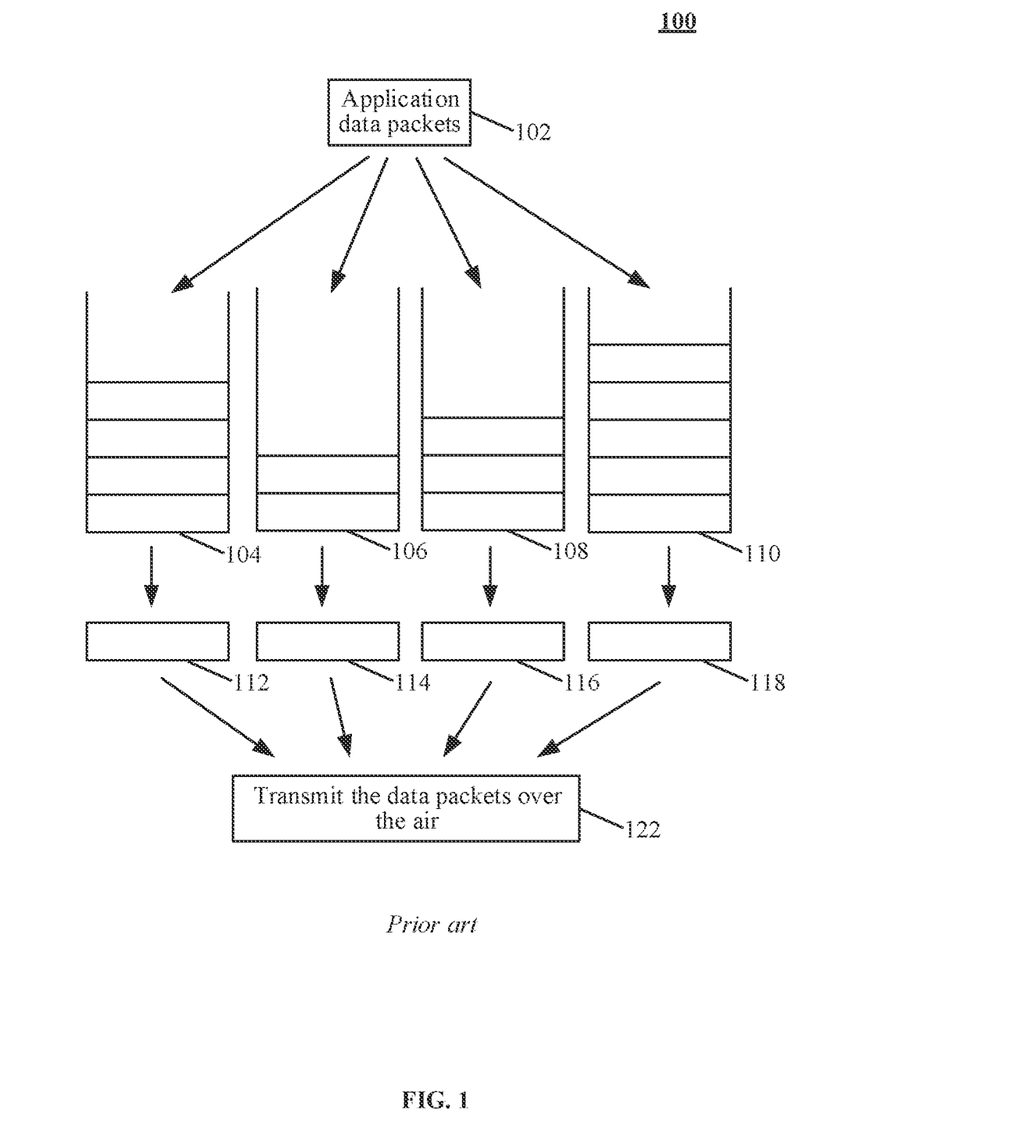
FIG. 1 is a block diagram illustrating a prior art collision resolution algorithm responsible for application data packet prioritization over wireless networks.

As shown in FIG. 1, computer software application data packets 102 are usually placed into four independent data packet transmission queues 104, 106, 108 and 110, namely the voice packet queue, the video packet queue, the best effort packet queue and the background packet queue in a Wi-Fi networking device (such as a router or a cable modem). The data packets 112, 114, 116, and 118 in the queues are transmitted over the air medium based on the queues' priorities at 122 to the destination wireless communication devices connected to the Wi Fi networking device. The collision resolution algorithm 100 responsible for traffic prioritization is probabilistic and depends on two timing parameters that vary for each Access Categories (AC). The two timing parameters are the minimum interframe space (AIFSN) and Random Backoff Wait (RBW). The packets with higher priority have a higher possibility to be successfully transmitted over a Wi-Fi network in an overflow traffic condition (also referred to as a congested condition).

The WMM paradigm certainly help improving QoS over WLAN (such as Wi-Fi networks). However, the categorization of data packets in WMM is too general and fails to account for more specific factors. Accordingly, the QoS is still low under the WMM approach. Accordingly, there is a need for a new method and a new system that overcome the shortcoming of the conventional approach and further improve the QoS over congested Wi-Fi networks. In particular, there is a need for a new method and a new system that improves the QoS by factoring in the application scenarios, the roles of the participating users, and the states of the users. For example, in an online class, the teacher as the speaker plays a more important role than students who are generally listeners. As another example, when a user is absent from her/his communication devices, the priority of her/his receiving media stream should be set at a lower level to maintain or improve other users' experiences in the same Wi-Fi network. The new prioritizing mechanism is more important for video streams, which are extensive in data volume.

SUMMARY OF THE DISCLOSURE

Generally speaking, pursuant to the various embodiments, the present disclosure provides a computer software system for prioritizing data packets for transmission to a wireless communication device over a wireless connection. The computer software system includes a computer software application adapted to be executed on the wireless communication device. The computer software application is adapted to determine a user state of the wireless communication device. The user state is associated with a destination identifier of the wireless communication device. The computer software application is adapted to determine an application scenario of the computer software application. The wireless communication device has a processing unit; a memory operatively coupled to the processing unit; an audio input interface operatively coupled to the processing unit; an audio output interface operatively coupled to the processing unit; a video input interface operatively coupled to the processing unit; a video output interface operatively coupled to the processing unit; the wireless network interface operatively coupled to the processing unit; and an operating system adapted to be executed by the processing unit. The computer software system also includes an application interface module adapted to be executed in a wireless networking device. The wireless networking device is adapted to create a wireless network. The wireless communication device is adapted to connect to the wireless networking device to access the Internet. The application interface module is adapted to receive the user state and the application scenario from the computer software application over the wireless network. The computer software system further includes a user role handler adapted to be executed in the wireless networking device. The user role handler is also adapted to determine a user role of a source wireless communication device identified by a sender identifier. In addition, the computer software system includes a data packet priority adjuster adapted to be executed in the wireless networking device. The data packet priority adjuster is adapted to adjust a data packet priority of a data packet received from the source wireless communication device and destined for the wireless communication device based on at least one of the application scenario, the user state and the user role before the data packet is scheduled to be sent to the wireless communication device over the wireless network, thereby forming an adjusted data packet priority. In one implementation, the data packet is a video data packet. The data packet priority adjuster decrements the data packet priority to form the adjusted data packet priority when the application scenario is nonurgent. In one implementation, the data packet priority is one of IEEE 802.1p Type of Service, IEEE 802.11 User Precedence, and Access Category; and the data packet priority adjuster decrements the data packet priority by two to form the adjusted data packet priority when the application scenario is nonurgent. The data packet priority adjuster decrements the data packet priority to form the adjusted data packet priority when the user state is uninterested or absent. In one implementation, the data packet priority is one of IEEE 802.1p Type of Service, IEEE 802.11 User Precedence, and Access Category; and the data packet priority adjuster decrements the data packet priority by two to form the adjusted data packet priority when the user state is uninterested or by four to form the adjusted data packet priority when the user state is absent. The data packet priority adjuster decrements the data packet priority to form the adjusted data packet priority when the user role is a listener. In one implementation, the data packet priority is one of IEEE 802.1p Type of Service, IEEE 802.11 User Precedence, and Access Category; and the data packet priority adjuster decrements the data packet priority by two to form the adjusted data packet priority when the user role is a listener. The user role is a speaker when a number of audio data packets from the source wireless communication device during a predetermined window of time is over a predetermined threshold, and a listener when the number is below the predetermined threshold. The computer software application determines the user state based on a set of images captured by the video input interface of the wireless communication device and a time of eye gazing direction toward the video output interface of the wireless communication device.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

A person of ordinary skills in the art will appreciate that elements of the figures above are illustrated for simplicity and clarity, and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skill in the art will appreciate that, for the purpose of simplicity and clarity of illustration, some commonly known and wedunderstood elements that are useful and/or necessary in a commercially feasible embodiment may not be depicted in order to provide a clear view of various embodiments in accordance with the present teachings.

DETAILED DESCRIPTION

Figure 2:
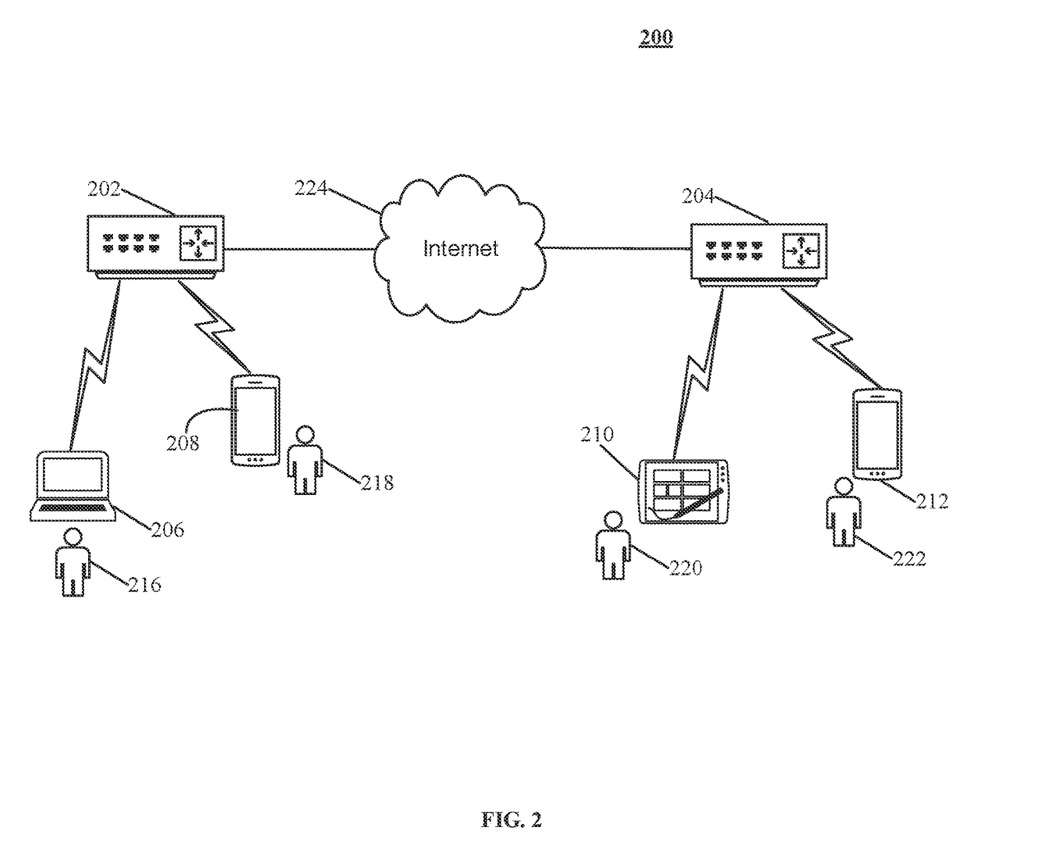
FIG. 2 is a block diagram illustrating a wireless communication system in accordance with this disclosure.

Turning to the Figures and to FIG. 2 in particular, a block diagram illustrating a wireless communication system is shown and generally indicated at 200. The wireless communication system includes a set of wireless communication devices, such as those indicated at 206, 208, 210 and 212, adapted to communicate with each other over a network (such as the Internet) 224. In one implementation, the network communication protocol is Transmission Control Protocol (TCP) and the Internet Protocol (IP) (collectively referred to as TCP/IP). The devices 206-212 are operated or otherwise used by the users 216, 218, 220 and 222 respectively. The users 216-222 are referred to herein as participants and persons. The devices 206-212 are also referred to herein as participating devices. The devices 206-208 connect to the Internet 224 via a wireless network device 202, while the devices 210-212 connect to the Internet 224 via a wireless network device 204. The wireless network devices 202-204, such as Wi Fi wireless routers or modems, each create a wireless network. Accordingly, the wireless network devices 202-204 are also referred to herein as wireless networks.

The wireless communication devices 206-212 each can be a laptop computer, a tablet computer, a smartphone, or other types of portable devices capable of accessing the Internet 224 over a wireless network. Taking the device 206 as an example, the devices 206-212 are further illustrated by reference to FIG. 3.

Figure 3:
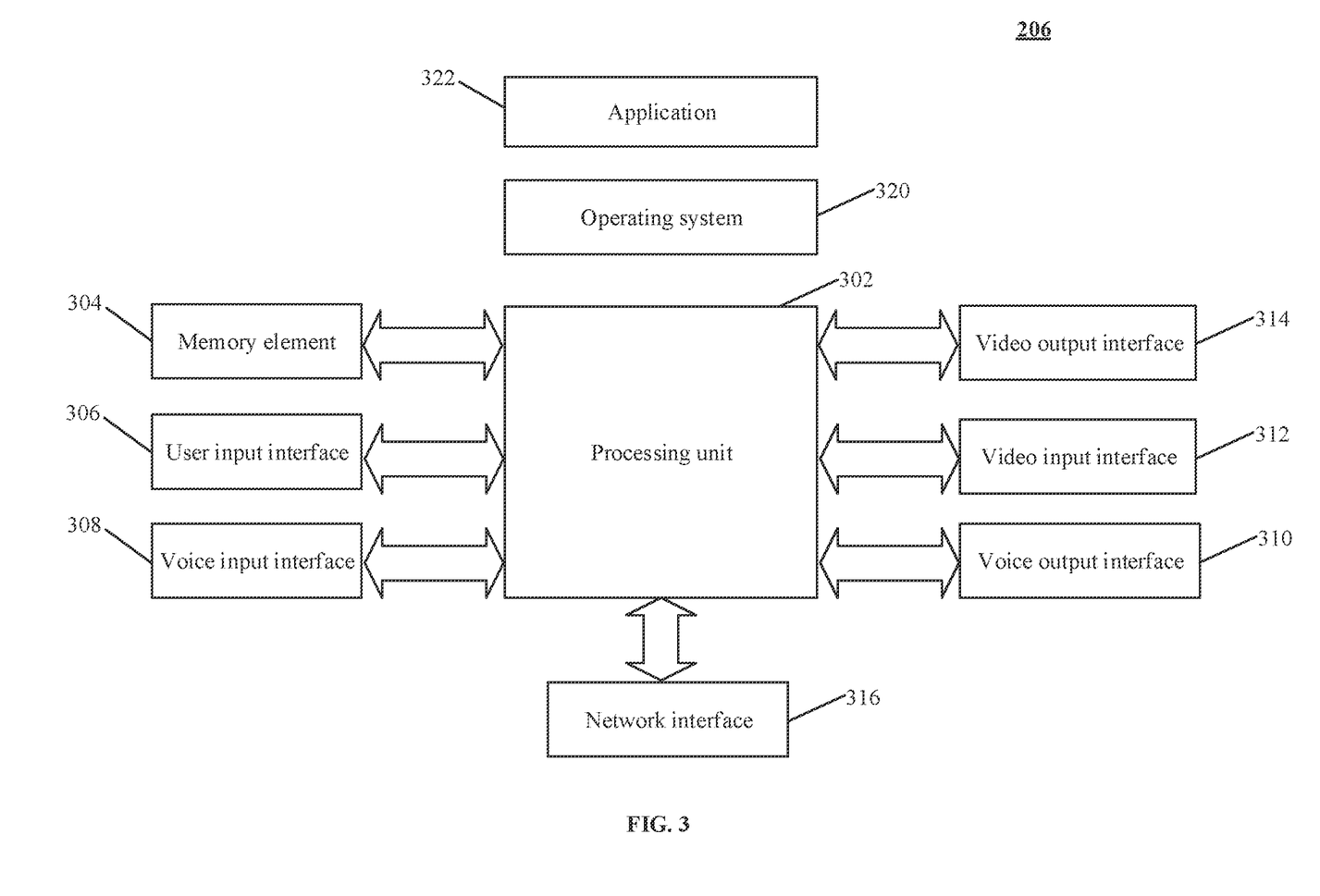
FIG. 3 is a block diagram illustrating a wireless communication device in accordance with this disclosure.

Referring to FIG. 3, a block diagram illustrating the wireless communication device 206 is shown. The device 206 includes a processing unit 302, some amount of memory 304 operatively coupled to the processing unit 302, one or more user input interfaces (such as a touch pad, a keyboard, a mouse, etc.) 306 operatively coupled to the processing unit 302, a voice input interface (such as a microphone) 308 operatively coupled to the processing unit 302, a voice output interface (such as a speaker) 310 operatively coupled to the processing unit 302, a video input interface (such as a camera) 312 operatively coupled to the processing unit 302, a video output interface (such as a display screen) 314 operatively coupled to the processing unit 302, and a wireless network interface (such as a Wi Fi network interface) 316 operatively coupled to the processing unit 302. The device 206 also includes an operating system (such as iOS®, Android®, etc.) 320 running on the processing unit 302. One or more computer software applications 322 are loaded and executed on the device 206. The computer software applications 322 is implemented using computer software programming languages, such as C, C++, C#, Java, etc.

Figure 4:
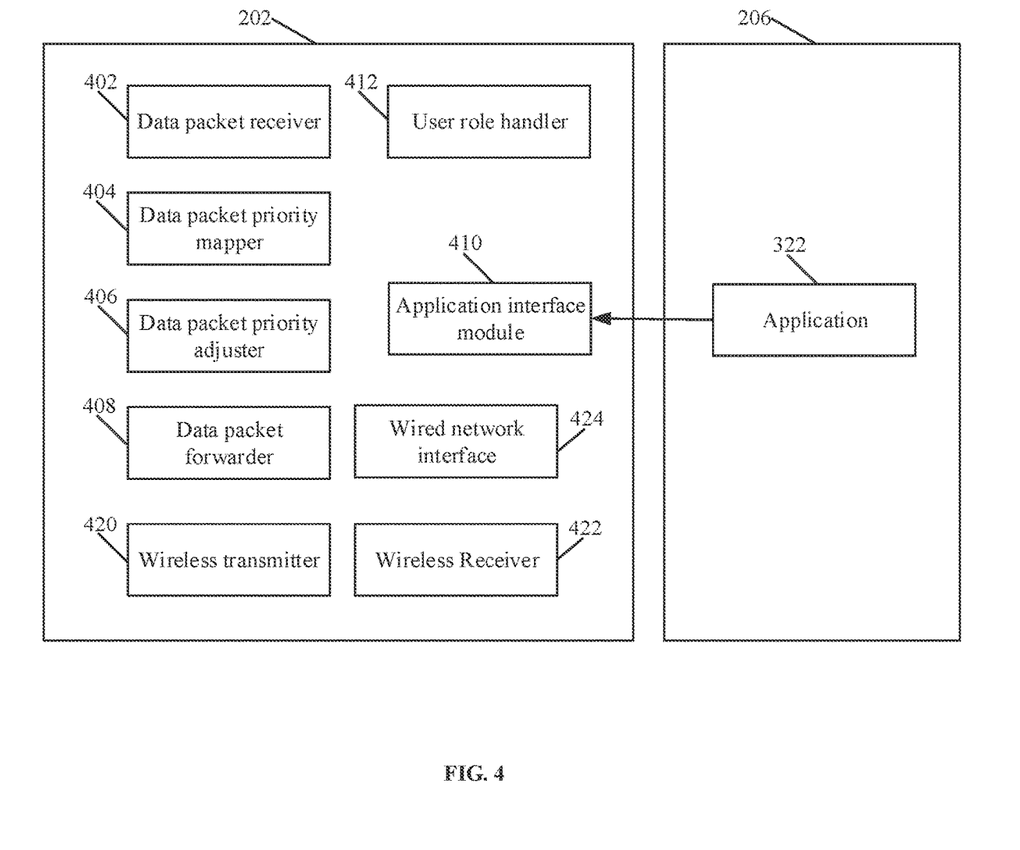
FIG. 4 is a block diagram illustrating a wireless networking device and a wireless communication device in accordance with this disclosure.

Referring to FIG. 4, a block diagram illustrating the wireless network device 202 and the wireless communication device 206 is shown. The wireless network device 202 (or 204) includes a wireless transmitter 420 for sending data to the devices 206-208, a wireless receiver 422 for receiving data from the devices 206-208, and a wired network interface 424 for accessing the Internet 224. The components 420-422 can be a single transceiver component. The wireless network device 202 also includes computer software modules, such as a data packet receiver 402, a data packet priority mapper 404, a data packet priority adjuster 406, a data packet forwarder 408, an application interface module 410, and a user role handler 412. The data packet receiver 402 retrieves data packets received by the receiver 422. The data packet forwarder 408 sends data packets to the transmitter 402 for transmission over the air medium.

Figure 5:
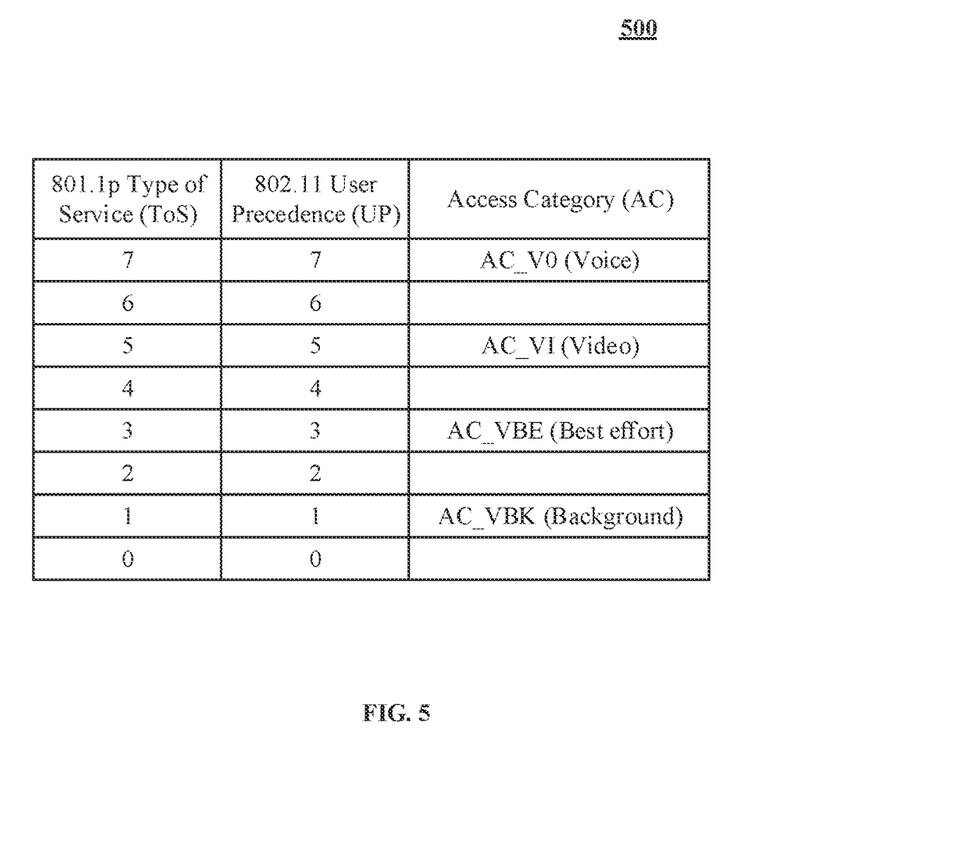
FIG. 5 is a table illustrating the data packet priority mapping.

The data packet priority mapper 404 maps the priorities of the received data packets. In one implementation, the mapping conforms with the IEEE 802.11e standard. In particular, the IP header of a data packet contains a 3-bit PRI field, which indicates the Type of Service (ToS). The data packet priority mapper 404 maps the PRI value to user priorities (UP) and the four Access Categories (AC) as shown in FIG. 5.

The data packet priority adjuster 406 adjusts the mapped priority of a data packet. The adjustment factors in at least one of the application scenario, the user role, and the user state. The application scenario indicates the type of the application 322, such as real-time video conference call applications, real-time voice conference call applications, entertainment applications (such as computer video games), education applications (such as school teaching applications), etc. In one implementation, the application scenario is either urgent or unurgent. The user role indicates whether a user (such as the users 216-222) is a speaker or a listener during a communication session, such as a real-time video conference call or a real-time class. The user roles of the users 216-222 are also said to be the user roles of the devices 206-212 respectively. The user role is determined by the user role handler module 412. The user state indicates whether a user is interested, uninterested or even absent during the communication. The user states of the users 216-222 are also said to be the user states of the devices 206-212 respectively. The application scenario and the user state data are received by the application interface module 410 from the application 322.

Figure 7:
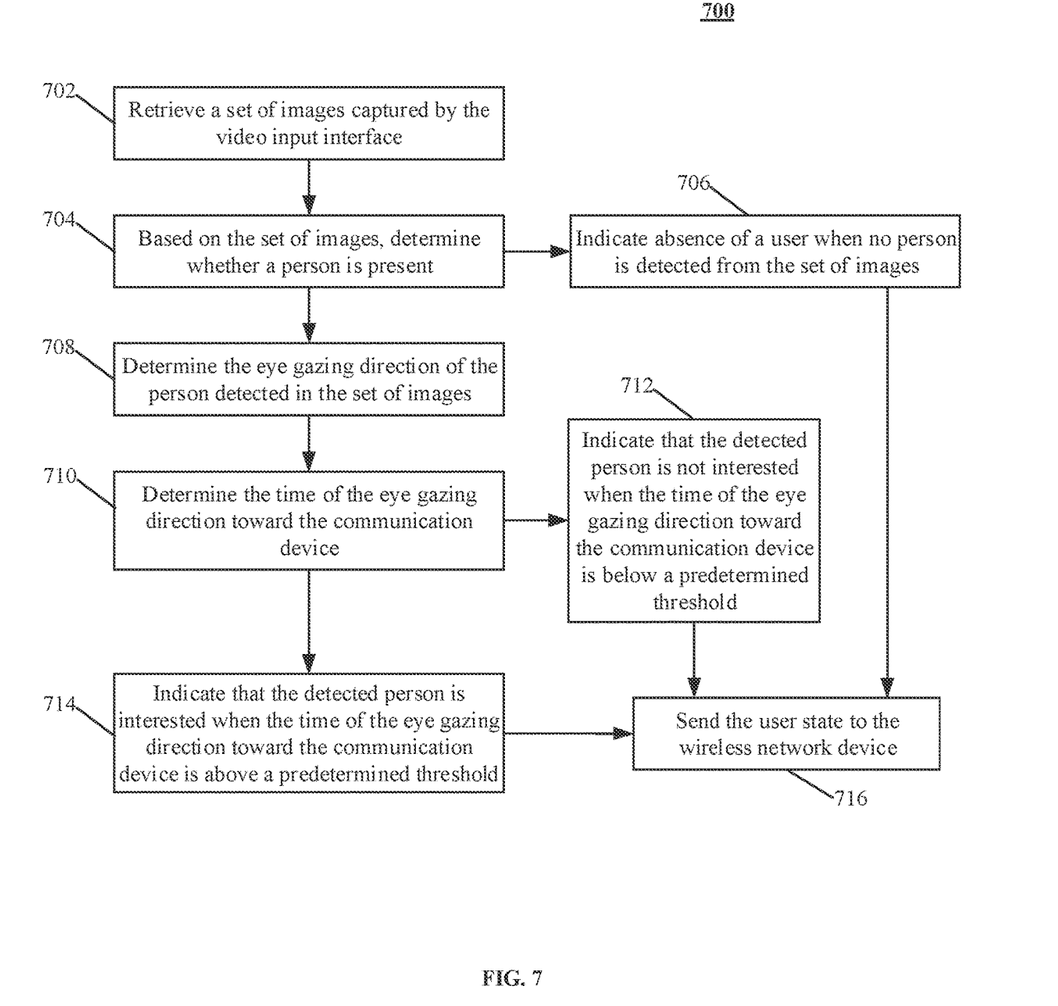
FIG. 7 is a flowchart illustrating a process by which a computer software application running on a wireless communication device determines user states in accordance with this disclosure.

The application 322 determines the user state of the user of the wireless communication device on which the application 322 is running. The user state can be interested, uninterested or absent. The process by which the application 322 determines the user state is further illustrated by reference to FIG. 7. Referring to FIG. 7, a flowchart illustrating the process by which the application 322, running on the device 206, determines the user state of the user 216 is shown and generally indicated at 700. The process 700 is performed by the application 322 running on the device 208-212 to determine the user state of the users 218-222 respectively.

At 702, the application 322 retrieves a set of images captured by the video input interface 308. At 704, based on the set of images, the application 322 determines whether a person (such as the user 216) is present. To do so, the application 322 performs image analysis to recognize a human figure in the set of images. When the application 322 determines that there is no person present in the set of the images, at 706, the application 322 indicates absent as of the user state. At 716, the application 322 sends the user state to the application interface module 410 of the wireless network device 202. When there is a human figure present in the set of images, at 708, the application 322 determines the eye gazing direction of the person detected in the set of images. At 710, the application 322 determines the time of the eye gazing in the direction toward the video output interface 314.

When the time of the eye gazing direction of the detected person toward the display screen 314 is above a predetermined threshold, such as five minutes, at 714, the application 322 indicates that the detected person is interested. In other words, the user state of the user 216 is interested. Otherwise, at 712, the application 322 indicates that the detected person is uninterested. In other words, the user state of the user 216 is uninterested. In either case, at 716, the application 322 send the user state to the application interface module 410 of the wireless network device 202.

Figure 10:
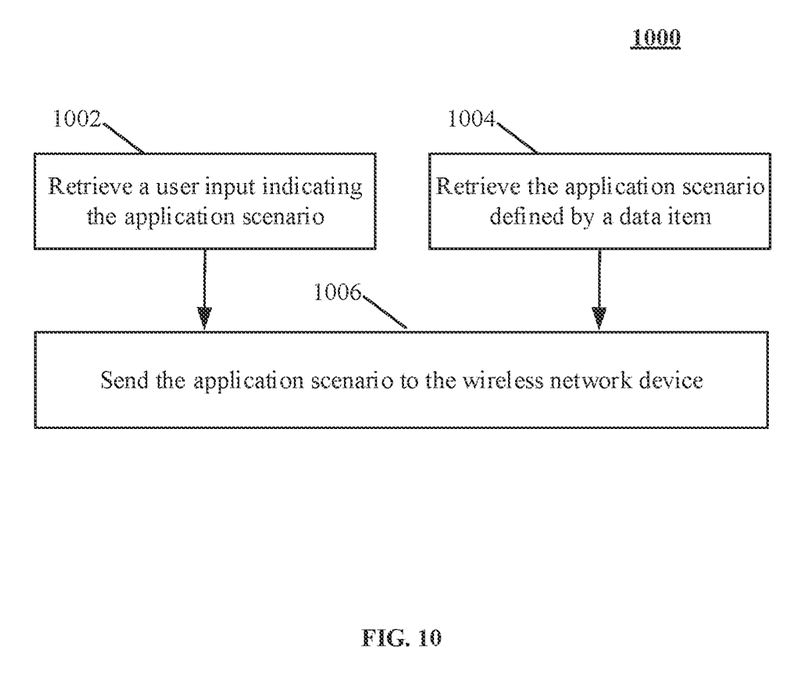
FIG. 10 is a flowchart illustrating a process by which a computer software application provides application scenarios to a wireless networking device in accordance with this disclosure.

The process by which the application 322 provides the application scenario to the wireless network devices 202-204 is further illustrated by reference to FIG. 10. Turning to FIG. 10, a flowchart depicting a process by which the application 322 provides the application scenario to a wireless network device, such as the device 202, is shown and generally indicated at 1000. At 1002, the application 322 retrieves a user input indicating the application scenario, such as a real-time video conference call. The user input can be a selection within a user interface displayed on the display screen 314. Alternatively, at 1004, the application 322 retrieves the application scenario defined by a predetermined data item. In either case, the application 322 is said to have retrieved the application scenario from a user input. At 1006, the application 322 sends the application scenario to the application interface module 410 of the wireless network device 202. In one implementation, the application scenario is either urgent or nonurgent.

Figure 8:
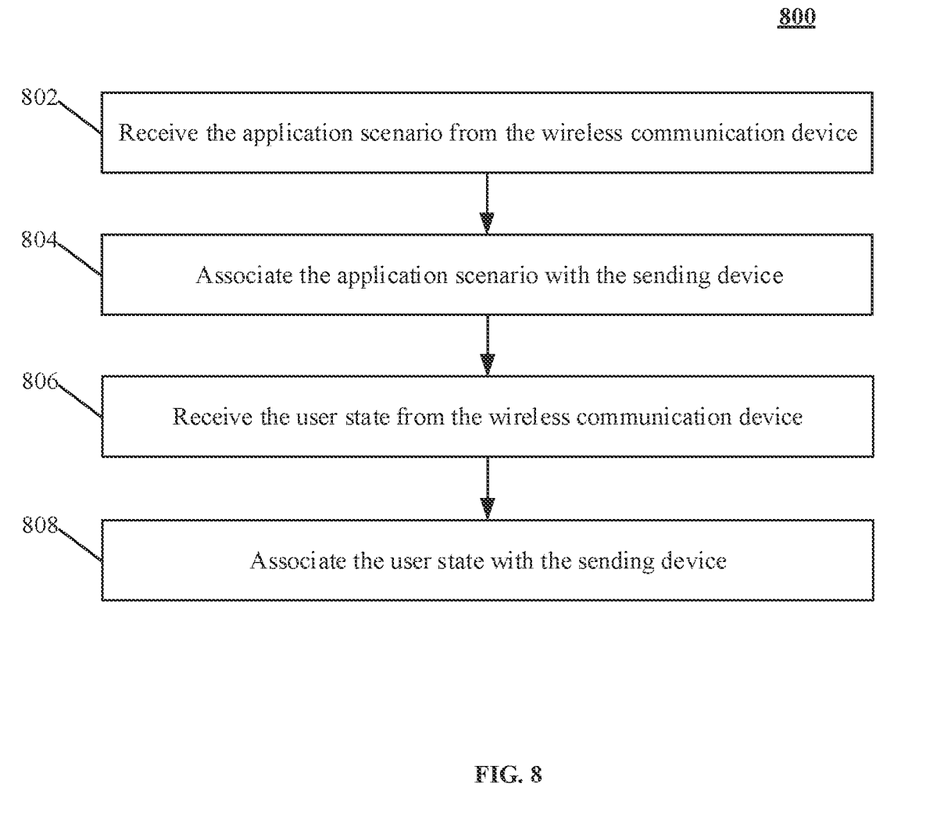
FIG. 8 is a flowchart illustrating a process by which a wireless networking device handles application scenarios and user states in accordance with this disclosure.

The process by which the application interface module 410 handles the application scenario and the user state is further illustrated by reference to FIG. 8. Turning to FIG. 8, a flowchart depicting the process is shown and generally indicated at 800. At 802, the application interface module 410 running in the wireless networking device 202 receives the application scenario from the device 206. It should be noted that the application interface module 410 may receive the application scenarios from other wireless communication devices (such as device 208) wirelessly coupled to the wireless network device 202, Similarly, the instance of the application interface module 410 running in the wireless network device 204 receives the application scenario from the devices 210-212.

At 804, the application interface module 410 associates the received application scenario with the sending device 206. For example, the association is identified by the IP address of the device 206, Regarding data packets destined to the device 206, this IP address is also referred to herein as the destination IP address, destination device identifier, and destination identifier, At 806, the application interface module 410 receives the user state of the user 216 from the device 206, Similarly, it receives the user state of the user 218 from the device 208, while the instance of the application interface module 410 running on the device 204 receives the user states of the users 220-222 from the devices 210-212 respectively. At 808, the application interface module 410 associates the received user state with the device 206 by, for example, the IP address of the device 206.

Figure 6:
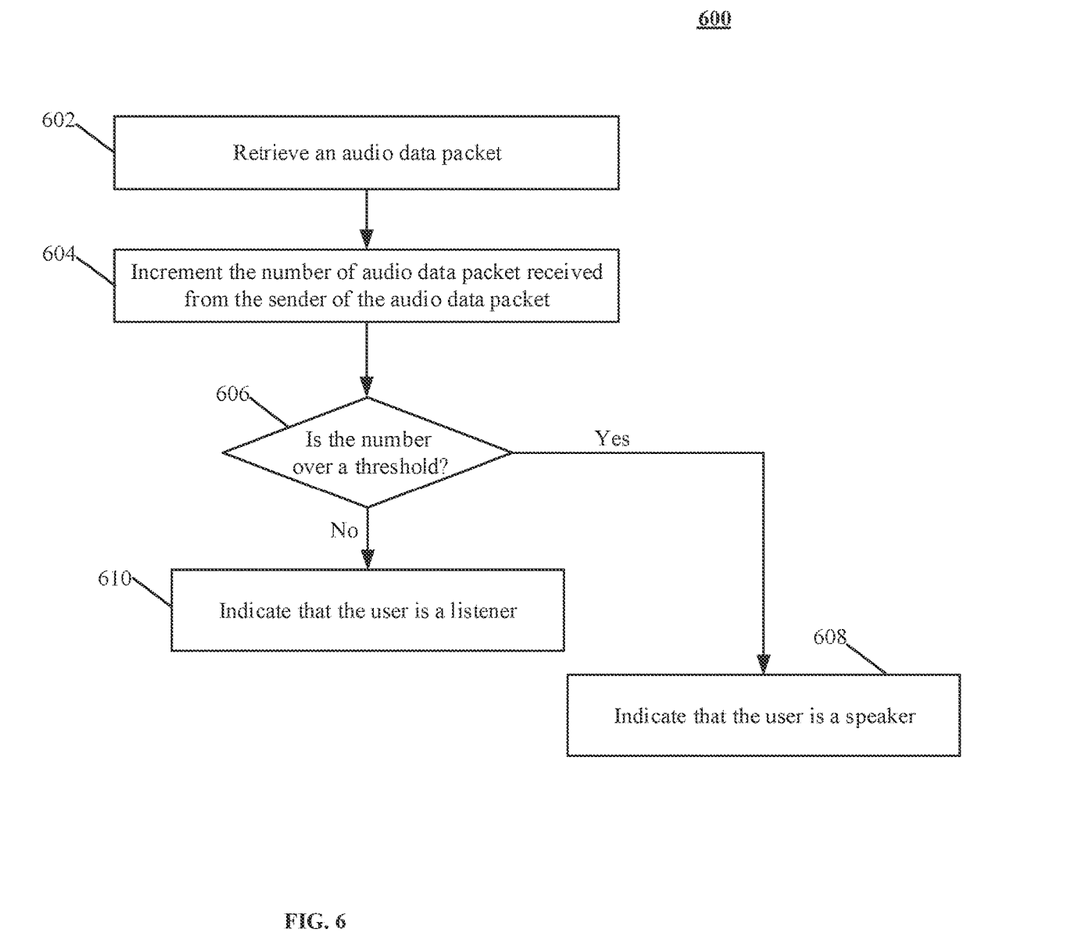
FIG. 6 is a flowchart depicting a process by which a wireless networking device determines user roles in accordance with this disclosure.

Referring to FIG. 6, a flowchart depicting a process by which the user role handler 412 determines the user roles of the users is shown and generally indicated at 600. At 602, the user role handler 412 retrieves an audio data packet received from one of the wireless communication devices 206-212. The audio data packet includes an identifier of the sending device (i.e., sender), such as the IP address of the device 206. At 604, the user role handler 412 increments the number of the audio data packets received from the sender identified by the sender identifier during a predetermined window of time, such as every two minutes. At 606, the user role handler 412, at the end of the window of time, for each sender identifier, determines whether the corresponding number of received audio data packets during the window of time is over a predetermined threshold (such as 1000). If yes, at 608, the user role handler 412 indicates that the user and the device associated with the sender identifier is a speaker. Otherwise, at 610, the user role handler 412 indicates that the user and the device is a listener. The indications can be achieved by, for example, a data item in memory.

The wireless networking devices 202-204 each incorporates the data packet priority adjuster 406 to adjust the data forwarding priority of data packets to be sent out over their respective wireless networks. The data packet priority adjuster 406 factors in the application scenario, the user state and the user role in determining the data packets' priorities before the data packets are placed in the data forwarding queues, such as the queues 104-110. The process by which the wireless network device 202 (such as a Wi-Fi network access point) adjusts the data packets priority before they are sent to the wireless communication device 206 is further illustrated by reference to FIG. 9.

Figure 9:
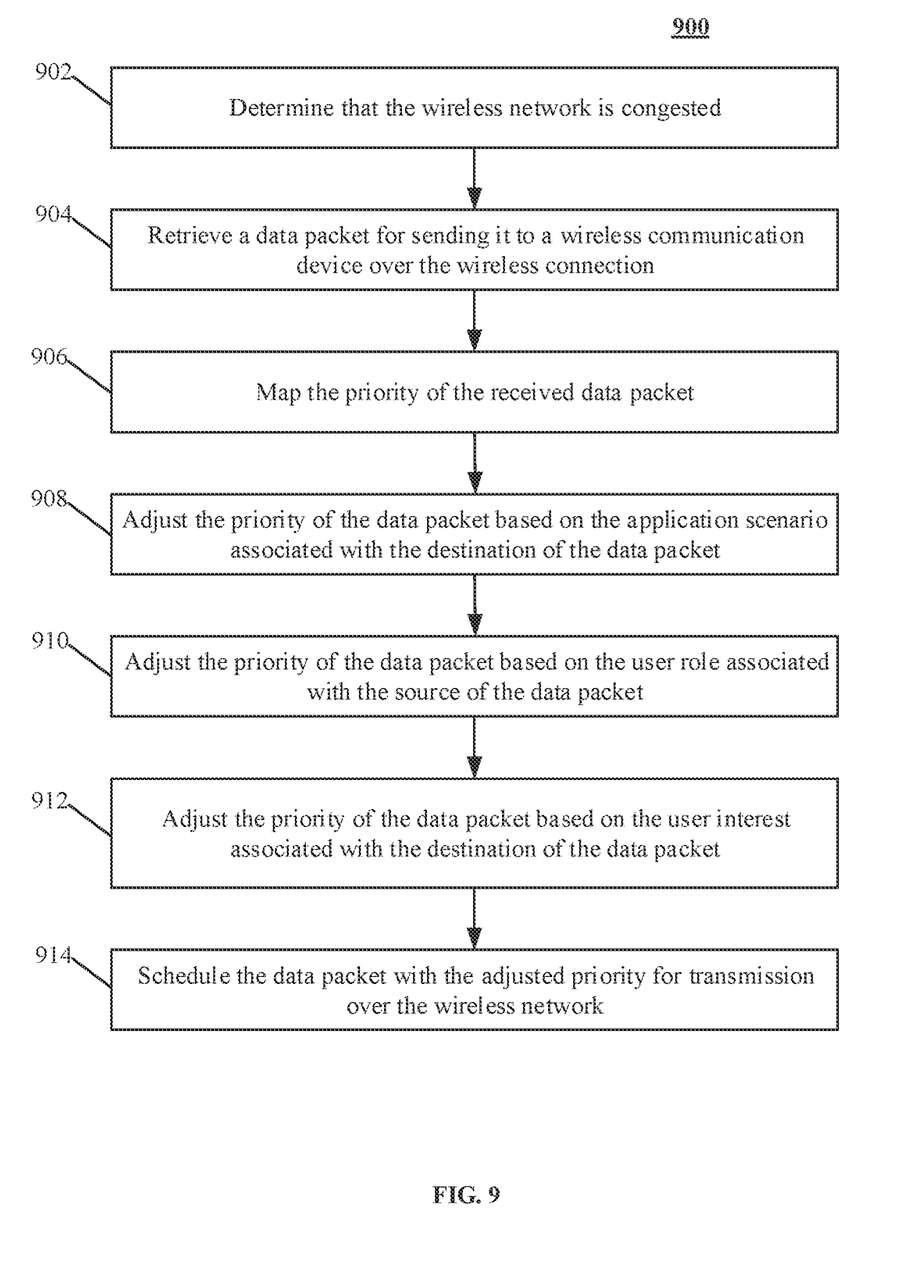
FIG. 9 is a flowchart illustrating a process by which a wireless networking device adjusts data packets' priorities before they are sent to a wireless communication device in accordance with this disclosure.

Referring to FIG. 9, the flow chart illustrating the process is shown and generally indicated at 900. At 902, the wireless networking device 202 determines that its wireless network is congested. In other words, the downlink from the wireless network device 202 to its connected devices, such as the devices 206-208, is in a congested state. In such as case, the data packet priority adjuster 406 is performed to prioritize data packets based on application scenarios, user states and user roles to achieve a desirable QoS. The congested state can be detected by a network monitoring module running in the device 202.

At 904, the data packet receiver 402 receives a data packet. For example, the data packet's sender (or source) is the device 210 and the targeted receiver (or destination) is the device 206. In such a case, the IP source address and the IP destination address of the data packets are the IP addresses of the devices 210 and 206 respectively. At 906, the data packet priority mapper 404 maps the priority of the received data packet. For example, it maps the ToS priority to the UP and the AC as shown in the table 500 of FIG. 5.

At 908, the data packet priority adjuster 406 adjusts the priority of the data packet based on the application scenario associated with the destination of the data packet. For example, when the data packet is a video data packet and the application scenario is urgent (such as a real-time conference call or a real-time class room session), at 908, the Access Category and the User Precedence (shown in FIG. 5) of the data packet are maintained the same (meaning adjusted by zero). Alternatively, they are increased. As another example, when the data packet is a video data packet and the application scenario is nonurgent (such as an entertainment application, such as a video playback), at 908, the data priority (such as the AC and UP of the data packet of FIG. 5) are decreased by two. In such a case, the adjusted UP is 3 while the adjusted AC is the same as AC_VBE (Best effort).

At 910, the data packet priority adjuster 406 adjusts the priority of the data packet based on the user role associated with the source of the data packet. The source is identified by the sender identifier, such as the source IP address of the data packet. For example, when the data packet is a video data packet from the device 210 and the user 220 is a speaker, at 910, the Access Category and the User Precedence (shown in FIG. 5) of the data packet are maintained the same. Alternatively, they are increased. As another example, when the data packet is a video data packet from the device 210 and the user 220 is a listener, at 910, the AC and UP of the data packet are decreased by two. In such a case, the adjusted UP is 3 while the adjusted AC is the same as AC_VBE (Best effort).

At 912, the data packet priority adjuster 406 adjusts the priority of the data packet based on the user interest associated with the destination of the data packet. For example, when the data packet is a video data packet and the user 206 is currently interested, at 910, the Access Category and the User Precedence (shown in FIG. 5) of the data packet are maintained the same. Alternatively, they are increased. As another example, when the data packet is a video data packet and the user 206 is not interested, at 912, the AC and UP of the data packet are decreased by two. In such a case, the adjusted UP is 3 while the adjusted AC is the same as AC_VBE (Best effort). Furthermore, if the user 206 is absent, at 912, the AC and UP of the data packet are decreased by four. In such a case, the adjusted UP is 1 while the adjusted AC is the same as AC_VBK (Background).

At 914, the data packet with the adjusted QoS priority is scheduled for being sent out to the device 206. For example, the data packet with the adjusted priority is placed in one of the queues 104-110 based on the adjusted priority. In one implementation, the process 900 is performed on video data packets only. The computer software application 322, the application interface module 410, the user role handler 412 and the data packet priority adjuster 406 form a computer software system for adjusting the data packet priority of data packets destined to the wireless communication device 206 on which the application 322 runs, while the application interface module 410, the user role handler 412 and the data packet priority adjuster 406 runs on the wireless networking device 202 to which the device 206 connects wirelessly.

Obviously, many additional modifications and variations of the present disclosure are possible in light of the above teachings. Thus, it is to be understood that, within the scope of the appended claims, the disclosure may be practiced otherwise than is specifically described above. For example, the modules 406, 410 and 412 can be implemented as a single or more than one module. As another example, only one or two of the elements 908, 910 and 912 are performed on data packets. As still yet another example, the data packet priority adjustment is performed only on video data packets to be sent out over a wireless link to a receiving device, such as the device 206.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification, but be defined by the claims set forth below. In addition, although narrow claims may be presented below, it should be recognized that the scope of this invention is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A method for prioritizing data packets for transmission to a wireless communication device over a wireless connection, said method performed by a computer software system and comprising
   (1) determining a user state of said wireless communication device by a computer software application, said computer software application running on said wireless communication device, said user state associated with a destination identifier of said wireless communication device;
   (2) determining an application scenario of said computer software application by said computer software application;
   (3) receiving said user state from said computer software application by a wireless networking device, said wireless networking device adapted to create a wireless network, said wireless communication device adapted to connect to said wireless networking device;
   (4) receiving said application scenario from said computer software application by said wireless networking device;
   (5) determining a user role of a source wireless communication device by said wireless networking device, said source wireless communication device identified by a sender identifier, wherein said user role is a speaker when a number of audio data packets from said source wireless communication device during a predetermined window of time is over a predetermined threshold, and a listener when said number is below said predetermined threshold wherein said predetermined threshold is a positive number; and
   (6) adjusting, by said wireless networking device, a data packet priority of a data packet based on at least one of said application scenario, said user state and said user role before said data packet is scheduled to be sent, to said wireless communication device over said wireless network, thereby forming an adjusted data packet priority, wherein said data packet is received from said source wireless communication device and destined for said wireless communication device.

2. The method of claim 1 further comprising decrementing, by a data packet priority adjuster running in said wireless networking device, said data packet priority to form said adjusted data packet priority when said application scenario is nonurgent.

3. The method of claim 1 further comprising decrementing, by a data packet priority adjuster running in said wireless networking device, said data packet priority to form said adjusted data packet priority when said user state is uninterested or absent.

4. The method of claim 1 wherein said computer software system includes said computer software application an application interface module running in said wireless networking device and adapted to receive said application scenario from said computer software application, a user role handler running in said wireless networking device and adapted to determine said user role, and a data packet priority adjuster running in said wireless networking device and adapted to adjust said data packet priority.

5. The method of claim 1 further comprising decrementing, by said data packet priority adjuster, said data packet priority to form said adjusted data packet priority when said user role is a listener.

* * * * *